No. 607,241. Patented July 12, 1898.
C. B. HOBRON.
BALL BEARING AXLE BOX.
(Application filed Jan. 24, 1898.)
(No Model.)
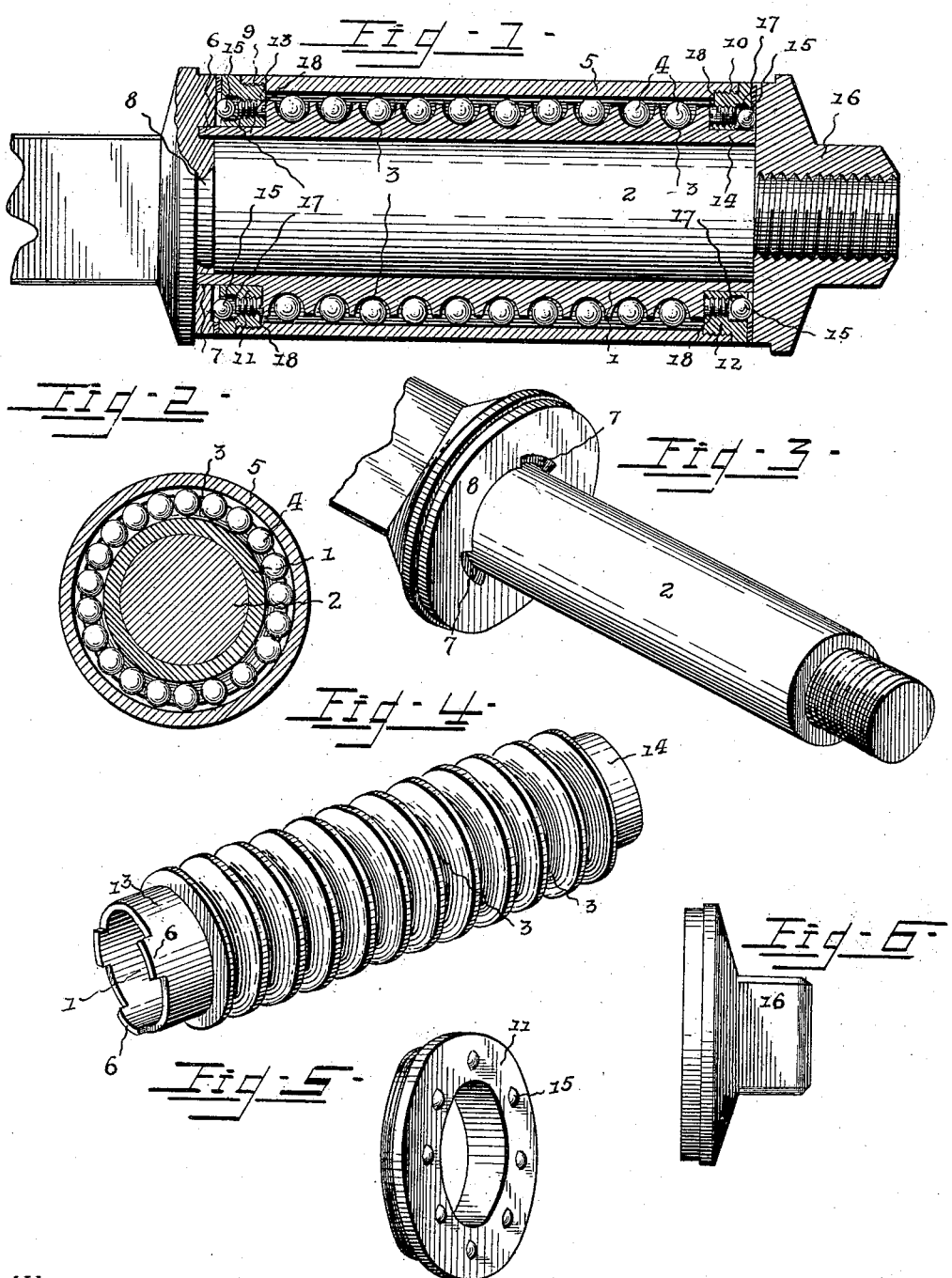
Witnesses:-
Charles B. Hobron, Inventor:-
By his Attorneys,

UNITED STATES PATENT OFFICE.

CHARLES BINGLEY HOBRON, OF BOERNE, TEXAS.

BALL-BEARING AXLE-BOX.

SPECIFICATION forming part of Letters Patent No. 607,241, dated July 12, 1898.

Application filed January 24, 1898. Serial No. 667,748. (No model.)

*To all whom it may concern:*

Be it known that I, CHARLES BINGLEY HOBRON, a citizen of the United States, residing at Boerne, in the county of Kendall and State of Texas, have invented a new and useful Ball-Bearing Axle-Box, of which the following is a specification.

The invention relates to improvements in ball-bearing axle-boxes.

The object of the present invention is to improve the construction of ball-bearing axle-boxes and to provide a simple and inexpensive one which will be dust-proof and in which friction will be reduced to a minimum.

A further object of the invention is to remove the wear from the spindle, so that the latter will not become worn and require renewing or altering.

The invention consists in the construction and novel combination and arrangement of parts, as hereinafter fully described, illustrated in the accompanying drawings, and pointed out in the claims hereto appended.

In the drawings, Figure 1 is a longitudinal sectional view of a ball-bearing axle-box constructed in accordance with this invention and shown applied to a spindle. Fig. 2 is a transverse sectional view. Fig. 3 is a perspective view of the spindle. Fig. 4 is a similar view of the bearing-sleeve. Fig. 5 is a detail view of one of the end bearing-rings. Fig. 6 is a detail view of the nut.

Like numerals of reference designate corresponding parts in all the figures of the drawings.

1 designates a bearing-sleeve arranged on and interlocked with a spindle 2 and provided with a series of annular channels or grooves 3, forming ball-races and receiving balls 4, which are interposed between the bearing-sleeve 1 and an axle-box 5, forming an outer casing for the balls. The inner end of the bearing-sleeve 1 is extended and provided with lugs 6, arranged at intervals and fitting in corresponding recesses 7, which are formed in a shoulder 8 at the inner end of the spindle. By this construction the bearing-sleeve is firmly interlocked with the spindle and is held rigid therewith, so that the spindle is prevented from being worn and does not require renewing.

The ends 9 and 10 of the axle-box 5 are provided with interior annular recesses and are threaded to receive end bearing-rings 11 and 12, which are threaded and provided with outwardly-extending flanges, which fit against the edges of the axle-box. The end rings, which close the ends of the axle-box and exclude dust from the balls, fit on smooth extensions 13 and 14 of the bearing-sleeve and are each provided with an annular series of bearing-balls 15, projecting from their outer faces in order to abut against the shoulder at the inner end of the spindle and the inner face of the axle-nut 16. The bearing-balls 15 are arranged in openings 17, extending entirely through the end rings and having their inner portions threaded and receiving screw-plugs 18, which retain the balls in the openings. The outer ends of the openings are of less diameter than the diameter of the balls, so that the balls are retained in the openings while projecting therefrom. The space between the outer end ring 12 and the inner face of the nut is designed to be covered by a band or washer of any suitable material to exclude dust from the bearing-faces.

The outer end of the spindle is threaded to receive the nut 16, which retains the wheel on the axle in the usual manner. The axle-box, which is fixed to a wheel, rotates with the same, and the bearing-sleeve, which is fixed to the spindle, is stationary, and the wear, which is reduced to a minimum, is borne by the bearing-sleeve, the balls, and the axle-box.

The invention has the following advantages: The ball-bearing axle-box, which is exceedingly simple and inexpensive in construction, is dust-proof and adapted to reduce friction to a minimum. The device is also adapted to relieve the spindle of wear, so that it is unnecessary to renew or alter the same.

Changes in the form, proportion, and minor details of construction may be resorted to without departing from the spirit or sacrificing any of the advantages of this invention, such as varying the number and arrangement of the balls of the end bearing-rings.

What I claim is—

1. In a device of the class described, the combination with a spindle provided at its inner end with a shoulder, of a bearing-sleeve arranged on the spindle and interlocked with the shoulder thereof and provided with a series of annular grooves or channels forming ball-races, an axle-box arranged over the bearing-sleeve, balls arranged in the races of the bearing-sleeve and extended from one end of the axle-box to the other, and the end rings closing the ends of the axle-box, substantially as and for the purpose described.

2. In a device of the class described, the combination of a spindle provided at its inner end with a shoulder having a series of recesses, a bearing-sleeve provided with a series of annular ball-races and having at its inner end a series of projecting lugs fitting in the recesses of the spindle and interlocking the bearing-sleeve with the same, an axle-box, and balls arranged in the ball-races and interposed between the bearing-sleeve and the axle-box, substantially as described.

3. In a device of the class described, the combination of a bearing-sleeve designed to be arranged on a spindle and provided with a series of annular channels forming ball-races, said sleeve having smooth extensions at its ends, an axle-box provided at its ends with recesses and having the same threaded, balls interposed between the bearing-sleeve and the axle-box, and the threaded end rings arranged on the smooth extensions of the bearing-sleeve and fitting in and closing the ends of the axle-box and engaging the threads of the recesses, substantially as described.

4. In a device of the class described, the combination of an axle-box spindle, balls arranged within the axle-box and interposed between the same and the spindle, an end ring secured to the axle-box and provided with openings threaded at their inner portions, balls arranged within the openings and projecting beyond the outer face of the ring, and threaded plugs closing the inner ends of the openings, substantially as described.

5. In a device of the class described, the combination with a spindle having a shoulder at its inner end, and an axle-nut, of an axle-box, balls interposed between the spindle and the axle-box, the end rings closing the ends of the axle-box and provided with openings having contracted outer ends, and antifriction-balls secured within the openings of the end rings and projecting through the contracted outer ends of said openings and engaging the shoulder of the spindle and the axle-nut, substantially as described.

In testimony that I claim the foregoing as my own I have hereto affixed my signature in the presence of two witnesses.

CHARLES BINGLEY HOBRON.

Witnesses:
J. STEWART CLARKE,
CHAS. PHILLIP.